United States Patent
Aziz et al.

(10) Patent No.: US 8,204,984 B1
(45) Date of Patent: Jun. 19, 2012

(54) SYSTEMS AND METHODS FOR DETECTING ENCRYPTED BOT COMMAND AND CONTROL COMMUNICATION CHANNELS

(75) Inventors: Ashar Aziz, Fremont, CA (US); Wei-Lung Lai, Cupertino, CA (US); Jayaraman Manni, San Jose, CA (US)

(73) Assignee: FireEye, Inc., Milpitas, CA (US)

( * ) Notice: Subject to any disclaimer, the term of this patent is extended or adjusted under 35 U.S.C. 154(b) by 363 days.

(21) Appl. No.: 11/998,750

(22) Filed: Nov. 30, 2007

Related U.S. Application Data

(63) Continuation-in-part of application No. 11/494,990, filed on Jul. 28, 2006, which is a continuation-in-part of application No. 11/471,072, filed on Jun. 19, 2006, which is a continuation-in-part of application No. 11/409,355, filed on Apr. 20, 2006, which is a continuation-in-part of application No. 11/096,287, filed on Mar. 31, 2005, and a continuation-in-part of application No. 11/151,812, filed on Jun. 13, 2005, and a continuation-in-part of application No. 11/152,286, filed on Jun. 13, 2005.

(60) Provisional application No. 60/868,324, filed on Dec. 1, 2006, provisional application No. 60/559,198, filed on Apr. 1, 2004, provisional application No. 60/579,953, filed on Jun. 14, 2004, provisional application No. 60/579,910, filed on Jun. 14, 2004.

(51) Int. Cl.
*G06F 15/16* (2006.01)
(52) U.S. Cl. .................................. 709/224; 726/22
(58) Field of Classification Search .................. 709/223, 709/224; 726/22–25
See application file for complete search history.

(56) References Cited

U.S. PATENT DOCUMENTS

| | | | |
|---|---|---|---|
| 4,292,580 | A | 9/1981 | Ott et al. |
| 5,175,732 | A | 12/1992 | Hendel et al. |
| 5,440,723 | A | 8/1995 | Arnold et al. |
| 5,657,473 | A | 8/1997 | Killean et al. |
| 5,978,917 | A | 11/1999 | Chi |
| 6,269,330 | B1 | 7/2001 | Cidon et al. |
| 6,298,445 | B1 | 10/2001 | Shostack |
| 6,357,008 | B1 | 3/2002 | Nachenberg |
| 6,424,627 | B1 | 7/2002 | Søhaug et al. |
| 6,487,666 | B1 | 11/2002 | Shanklin et al. |
| 6,493,756 | B1 | 12/2002 | O'Brien et al. |

(Continued)

FOREIGN PATENT DOCUMENTS

| | | |
|---|---|---|
| GB | 2439806 | 1/2008 |

(Continued)

OTHER PUBLICATIONS

Whyte et al. "DNS-based Detection of Scannin Worms in an Enterprise Network", Proceedings of the 12th Annual network and Distributed System Security Symposium, Feb. 2005. 15 pages.*

(Continued)

*Primary Examiner* — David Lazaro
(74) *Attorney, Agent, or Firm* — Carr & Ferrell LLP

(57) ABSTRACT

Methods and systems for detecting encrypted bot command and control communication channels are provided. In the exemplary method, the presence of a communication channel between a first network device and a second network device is monitored. Active and inactive periods of the network device are detected and a reverse channel is determined based on the detection. The first network device may then be flagged as potentially infected or suspected based on the reverse channel determination.

20 Claims, 6 Drawing Sheets

U.S. PATENT DOCUMENTS

| | | | |
|---|---|---|---|
| 6,550,012 B1 | 4/2003 | Villa et al. | |
| 6,775,657 B1 | 8/2004 | Baker | |
| 6,832,367 B1 | 12/2004 | Choi et al. | |
| 6,898,632 B2 | 5/2005 | Gordy | |
| 6,981,279 B1 | 12/2005 | Arnold et al. | |
| 7,007,107 B1 | 2/2006 | Ivchenko et al. | |
| 7,043,757 B2 | 5/2006 | Hoefelmeyer et al. | |
| 7,069,316 B1 | 6/2006 | Gryaznov | |
| 7,080,408 B1 | 7/2006 | Pak | |
| 7,093,239 B1 | 8/2006 | van der Made | |
| 7,100,201 B2 | 8/2006 | Izatt | |
| 7,159,149 B2 | 1/2007 | Spiegel et al. | |
| 7,231,667 B2 | 6/2007 | Jordan | |
| 7,240,364 B1* | 7/2007 | Branscomb et al. | 726/9 |
| 7,240,368 B1 | 7/2007 | Roesch | |
| 7,287,278 B2 | 10/2007 | Liang | |
| 7,308,716 B2 | 12/2007 | Danford et al. | |
| 7,356,736 B2 | 4/2008 | Natvig | |
| 7,386,888 B2 | 6/2008 | Liang | |
| 7,392,542 B2 | 6/2008 | Bucher | |
| 7,418,729 B2 | 8/2008 | Szor | |
| 7,428,300 B1* | 9/2008 | Drew et al. | 379/29.09 |
| 7,441,272 B2 | 10/2008 | Durham | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,523,493 B2 | 4/2009 | Liang | |
| 7,530,104 B1 | 5/2009 | Thrower et al. | |
| 7,540,025 B2 | 5/2009 | Tzadikario | |
| 7,565,550 B2 | 7/2009 | Liang et al. | |
| 7,603,715 B2 | 10/2009 | Costa et al. | |
| 7,639,714 B2 | 12/2009 | Stolfo et al. | |
| 7,644,441 B2 | 1/2010 | Schmidt et al. | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,779,463 B2 | 8/2010 | Stolfo et al. | |
| 7,784,097 B1 | 8/2010 | Stolfo et al. | |
| 7,849,506 B1 | 12/2010 | Dansey | |
| 7,904,959 B2 | 3/2011 | Sidiroglou et al. | |
| 7,908,660 B2 | 3/2011 | Bahl | |
| 7,996,556 B2 | 8/2011 | Raghavan et al. | |
| 7,996,905 B2 | 8/2011 | Arnold et al. | |
| 8,028,338 B1 | 9/2011 | Schneider et al. | |
| 8,069,484 B2 | 11/2011 | McMillan et al. | |
| 8,087,086 B1 | 12/2011 | Lai et al. | |
| 2001/0047326 A1 | 11/2001 | Broadbent et al. | |
| 2002/0018903 A1 | 2/2002 | Kokubo et al. | |
| 2002/0038430 A1 | 3/2002 | Edwards et al. | |
| 2002/0091819 A1 | 7/2002 | Melchione et al. | |
| 2002/0144156 A1 | 10/2002 | Copeland, III | |
| 2002/0162015 A1 | 10/2002 | Tang | |
| 2002/0184528 A1 | 12/2002 | Shevenell | |
| 2002/0188887 A1 | 12/2002 | Largman et al. | |
| 2002/0194490 A1 | 12/2002 | Halperin et al. | |
| 2003/0074578 A1 | 4/2003 | Ford et al. | |
| 2003/0084318 A1 | 5/2003 | Schertz | |
| 2003/0115483 A1 | 6/2003 | Liang | |
| 2003/0188190 A1 | 10/2003 | Aaron | |
| 2003/0200460 A1 | 10/2003 | Morota et al. | |
| 2004/0019832 A1 | 1/2004 | Arnold et al. | |
| 2004/0047356 A1 | 3/2004 | Bauer | |
| 2004/0083408 A1 | 4/2004 | Spiegel | |
| 2004/0111531 A1* | 6/2004 | Staniford et al. | 709/246 |
| 2004/0165588 A1 | 8/2004 | Pandya | |
| 2004/0236963 A1 | 11/2004 | Danford et al. | |
| 2004/0243349 A1 | 12/2004 | Greifeneder | |
| 2004/0249911 A1 | 12/2004 | Alkhatib | |
| 2004/0268147 A1 | 12/2004 | Wiederin et al. | |
| 2005/0033960 A1 | 2/2005 | Vialen et al. | |
| 2005/0033989 A1 | 2/2005 | Poletto | |
| 2005/0086523 A1 | 4/2005 | Zimmer et al. | |
| 2005/0091513 A1 | 4/2005 | Mitomo | |
| 2005/0114663 A1 | 5/2005 | Cornell | |
| 2005/0125195 A1 | 6/2005 | Brendel | |
| 2005/0157662 A1 | 7/2005 | Bingham et al. | |
| 2005/0183143 A1 | 8/2005 | Anderholm | |
| 2005/0201297 A1 | 9/2005 | Peikari | |
| 2005/0210533 A1 | 9/2005 | Copeland | |
| 2005/0238005 A1 | 10/2005 | Chen et al. | |
| 2005/0265331 A1 | 12/2005 | Stolfo | |
| 2006/0015715 A1 | 1/2006 | Anderson | |
| 2006/0021054 A1 | 1/2006 | Costa et al. | |
| 2006/0075496 A1 | 4/2006 | Carpenter et al. | |
| 2006/0095968 A1 | 5/2006 | Portolani | |
| 2006/0101516 A1 | 5/2006 | Sudaharan | |
| 2006/0101517 A1 | 5/2006 | Banzhof et al. | |
| 2006/0117385 A1* | 6/2006 | Mester et al. | 726/22 |
| 2006/0123477 A1 | 6/2006 | Raghavan | |
| 2006/0161983 A1 | 7/2006 | Cothrell | |
| 2006/0161987 A1 | 7/2006 | Levy-Yurista | |
| 2006/0164199 A1 | 7/2006 | Gilde et al. | |
| 2006/0184632 A1 | 8/2006 | Marino et al. | |
| 2006/0191010 A1* | 8/2006 | Benjamin | 726/23 |
| 2006/0221956 A1 | 10/2006 | Narayan et al. | |
| 2007/0006288 A1 | 1/2007 | Mayfield et al. | |
| 2007/0006313 A1 | 1/2007 | Porras et al. | |
| 2007/0016951 A1 | 1/2007 | Piccard | |
| 2007/0033645 A1* | 2/2007 | Jones | 726/12 |
| 2007/0038943 A1 | 2/2007 | FitzGerald et al. | |
| 2007/0064689 A1 | 3/2007 | Shin et al. | |
| 2007/0094730 A1 | 4/2007 | Bhikkaji et al. | |
| 2007/0192500 A1 | 8/2007 | Lum | |
| 2007/0192858 A1 | 8/2007 | Lum | |
| 2007/0198275 A1 | 8/2007 | Malden et al. | |
| 2007/0250930 A1 | 10/2007 | Aziz | |
| 2008/0005782 A1 | 1/2008 | Aziz | |
| 2008/0072326 A1 | 3/2008 | Danford et al. | |
| 2008/0080518 A1* | 4/2008 | Hoeflin et al. | 370/395.42 |
| 2008/0120722 A1 | 5/2008 | Sima et al. | |
| 2008/0141376 A1 | 6/2008 | Clausen et al. | |
| 2008/0222729 A1 | 9/2008 | Chen et al. | |
| 2008/0295172 A1 | 11/2008 | Bohacek | |
| 2008/0301810 A1 | 12/2008 | Lehane | |
| 2009/0031423 A1 | 1/2009 | Liu et al. | |
| 2009/0083369 A1 | 3/2009 | Marmor | |
| 2009/0083855 A1 | 3/2009 | Apap et al. | |
| 2009/0089879 A1 | 4/2009 | Wang | |
| 2009/0094697 A1 | 4/2009 | Provos et al. | |
| 2009/0271867 A1 | 10/2009 | Zhang | |
| 2009/0300761 A1 | 12/2009 | Park et al. | |
| 2009/0328221 A1 | 12/2009 | Blumfield et al. | |
| 2010/0054278 A1 | 3/2010 | Stolfo et al. | |
| 2010/0083376 A1 | 4/2010 | Pereira | |
| 2010/0115621 A1 | 5/2010 | Staniford et al. | |
| 2010/0281541 A1 | 11/2010 | Stolfo et al. | |
| 2010/0281542 A1 | 11/2010 | Stolfo et al. | |
| 2011/0093951 A1 | 4/2011 | Aziz | |
| 2011/0099633 A1 | 4/2011 | Aziz | |
| 2011/0247072 A1 | 10/2011 | Staniford et al. | |
| 2011/0314546 A1 | 12/2011 | Aziz et al. | |

FOREIGN PATENT DOCUMENTS

| | | |
|---|---|---|
| WO | 0206928 A2 | 1/2002 |
| WO | WO0223805 A2 | 3/2002 |

OTHER PUBLICATIONS

Kristoff, J. "Botnets, detection and mitigation: DNS-based techniques", NU Secutity Day 2005, 23 pages.*

IEEE Xplore Digital Library Search results for "detection of unknown computer worms". http://ieeexplore.ieee.org/search/searchresult.jsp?SortField=Score&SortOrder=desc&ResultC... Accessed on Aug. 28, 2009.

AltaVista Advanced Search Results. "Event Orchestrator". http://www.altavista.com/web/results?itag=ody&pg=aq&aqmode=s&aqa=Event+Orchestrator... Accessed on Sep. 3, 2009.

AltaVista Advanced Search Results. "attack vector identifier". http://www.altavista.com/web/results?itag=ody&pg=aq&aqmode=s&aqa=attack+vector+ide... Accessed on Sep. 15, 2009.

Costa, M. et al. "Vigilante: End-to-End Containment of Internet Worms," SOSP '05, Oct. 23-26, 2005, Association for Computing Machinery, Inc., Brighton U.K.

Chaudet, C. et al. "Optimal Positioning of Active and Passive Monitoring Devices," International Conference on Emerging Networking Experiments and Technologies, Proceedings of the 2005 ACM Conference on Emerging Network Experiment and Technology, Oct. 2005, pp. 71-82, CoNEXT '05, Toulousse, France.

Crandall, J.R. et al., "Minos:Control Data Attack Prevention Orthognal to Memory Model," 37th International Symposium on Microarchitecture, Dec. 2004, Portland, Oregon.

Kim, H. et al., "Autograph: Toward Automated, Distributed Worm Signature Detection," Proceedings of the 13th Usenix Security Symposium (Security 2004), Aug. 2004, pp. 271-286, San Diego.

Kreibich, C. et al., "Honeycomb—Creating Intrusion Detection Signatures Using Honeypots," 2nd Workshop on Hot Topics in Networks (HotNets-11), 2003, Boston, USA.

Newsome, J. et al., "Polygraph: Automatically Generating Signatures for Polymorphic Worms," In Proceedings of the IEEE Symposium on Security and Privacy, May 2005.

Newsome, J. et al., "Dynamic Taint Analysis for Automatic Detection, Analysis, and Signature Generation of Exploits on Commodity Software," In Proceedings of the 12th Annual Network and Distributed System Security, Symposium (NDSS '05), Feb. 2005.

Singh, S. et al., "Automated Worm Fingerprinting," Proceedings of the ACM/USENIX Symposium on Operating System Design and Implementation, Dec. 2004, San Francisco, California.

Margolis, P.E., Random House Webster's "Computer & Internet Dictionary 3rd Edition," ISBN 0375703519, Dec. 1998.

"Packet", Microsoft Computer Dictionary, Microsoft Press, Mar. 2002, 1 pg.

Silicon Defense, "Worm Containment in the Internal Network", Mar. 2003, pp. 1-25.

Nojiri, D. et al., "Cooperative Response Strategies for Large Scale Attack Mitigation", DARPA Information Survivability Conference and Exposition, Apr. 22-24, 2003, vol. 1, pp. 293-302.

Moore, D. et al., "Internet Quarantine: Requirements for Containing Self-Propagating Code", INFOCOM, Mar. 30-Apr. 3, 2003, vol. 3, pp. 1901-1910.

Williamson, Matthew M., "Throttling Viruses: Restricting Propagation to Defeat Malicious Mobile Code", ACSAC Conference, Dec. 2002, Las Vegas, NV, USA, pp. 1-9.

* cited by examiner

SYSTEMS AND METHODS FOR DETECTING ENCRYPTED BOT COMMAND AND CONTROL COMMUNICATION CHANNELS

CROSS-REFERENCE TO RELATED APPLICATIONS

This application claims benefit of provisional patent application No. 60/868,324, filed Dec. 1, 2006, entitled, "Detecting Encrypted Bot Command & Control Communication Channels", and is a continuation-in-part of U.S. patent application Ser. No. 11/494,990, filed Jul. 28, 2006, entitled "Dynamic Signature Creation and Enforcement", which is a continuation-in-part of U.S. patent application Ser. No. 11/471,072, filed Jun. 19, 2006, entitled "Virtual Machine with Dynamic Data Flow Analysis", which is a continuation-in-part of U.S. patent application Ser. No. 11/409,355, filed Apr. 20, 2006, entitled "Heuristic Based Capture with Replay to Virtual Machine", which is a continuation-in-part of U.S. patent application Ser. No. 11/096,287, filed Mar. 31, 2005, entitled "System and Method of Detecting Computer Worms", and is a continuation-in-part of U.S. patent application Ser. No. 11/151,812, filed Jun. 13, 2005, entitled "System and Method of Containing Computer Worms," and is a continuation-in-part of U.S. patent application Ser. No. 11/152, 286, Jun. 13, 2005, entitled "Computer Worm Defense System and Method", U.S. patent application Ser. No. 11/096, 287 claims the benefit of U.S. Provisional Application No. 60/559,198 filed on Apr. 1, 2004, U.S. patent application Ser. No. 11/151,812 claims the benefit of U.S. Provisional Application No. 60/579,953 filed on Jun. 14, 2004, and U.S. patent application Ser. No. 11/152,286 claims the benefit of U.S. Provisional Application No. 60/579,910 filed on Jun. 14, 2004, all of which are incorporated by reference herein.

This application is related to U.S. patent application Ser. No. 11/998,605, filed Nov. 30, 2007, and entitled "Systems and Methods for Detecting Communication Channels of Bots."

BACKGROUND OF THE INVENTION

1. Field of the Invention

The present invention relates generally to network security and more particularly to detecting encrypted bot command and control (C&C) communication channels.

2. Background Art

Presently, malicious software (i.e., malware) can attack various devices via a network. For example, malware may include any program or file that is harmful to a computer user, such as bots, computer viruses, worms, trojan horses, spyware, or any programming that gathers information about a computer user or otherwise operates without permission. Various processes and devices have been employed to prevent the problems that malware can cause.

A bot is a software robot configured to remotely control all or a portion of a computer without authorization by the computer's user. Bot related activities include bot propagation and attacking other computers on a network. Bots commonly propagate by scanning nodes (e.g., computers) available on a network to search for a vulnerable target. When a vulnerable computer is scanned, the bot may install a copy of itself. Once installed, the new bot may continue to seek other computers on a network to infect. It is also not uncommon for a computer to be purposefully configured to seek vulnerable computers on a network and install the bots. In some cases, a bot opens up a backdoor the infected host computer allowing access and, in some cases, control of the host computer.

A bot may also, without the authority of the infected computer user, establish a command and control communication channel to receive instructions. Bots may receive command and control communication with a centralized bot server or another infected computer (e.g., via a peer-to-peer (P2P) network established by bots on the infected system).

In some embodiments, the bot receives instructions to perform bot related activities. When a plurality of bots (i.e., a botnet) act together, the infected computers (i.e., zombies) can perform organized attacks against one or more computers on a network. In one example, bot infected computers may be directed to ping another computer on a network is a denial-of-service attack. In another example, upon receiving instructions, one or more bots may direct the infected computer to transmit spam across a network.

A bot may also receive instructions to transmit information regarding the infected host computer. In one example, the bot may be instructed to act as a keylogger and record keystrokes on the infected host computer. The bot may also be instructed to search for personal information and email addresses of other users contained in email or contacts file. This information may be transmitted to one or more other infected computers or a user in command of the bot or botnet Bots often take advantage of Internet Relay Chat (IRC) channels as command and control communications channels to receive instructions. Typically, the bot on the compromised device will open an Internet Relay Chat (IRC) channel and wait for commands from another bot, a bot server, or a person in control of the bot.

Communication (e.g., instructions) to or from bots is often encrypted. Although current antivirus programs can scan unencrypted data, the encrypted data (e.g., via Secure Sockets Layer (SSL)) typically cannot be examined to analyze the communication. As a result, bots often go undetected.

SUMMARY OF THE INVENTION

Methods and systems for detecting encrypted bot command and control communication channels are provided. In the exemplary method, the presence of a communication channel between a first network device and a second network device is monitored. Active and inactive periods of the network device are detected and a reverse channel is determined based on the detection. The first network device may then be flagged as potentially infected or suspected based on the reverse channel determination.

In some embodiments, the method further comprises determining if the reverse channel is associated with a white list. The method may also comprise determining if an IRC channel is established by the first network device. The method may also further comprise determining if the first network device scans a network.

In various embodiments, the method further comprises simulating a data flow between the first network device and the second network device. Simulating the data flow may comprise transmitting the data flow to a virtual machine. The response from the virtual machine may confirm the bot. A signature may be generated and provided to a bot detector or controller.

An exemplary system can comprise a channel monitoring module, an activity/inactivity detector module, and a reverse channel detection module. The channel monitoring module may be configured to monitor a channel between a first network device and a second network device. The activity/inactivity detector module may be configured to detect an active period and an inactive period of the first network device. The reverse channel detection module may be configured to determine. The flagging module may be configured to flag the first network device as potentially infected based on the reverse channel determination.

An exemplary computer readable medium may have embodied thereon executable instructions, the instructions being executable by a processor for detecting encrypted bot command & control communication channels, the method comprising monitoring a channel between a first network device and a second network device, detecting an active period and an inactive period of the first network device, determining a reverse channel based on the active and the inactive periods of the first network device and flagging the first network device as potentially infected.

DETAILED DESCRIPTION OF EXEMPLARY EMBODIMENTS

Exemplary systems and methods for detection of a command and control communication channel of a bot are provided. The bot running on a compromised device may be part of a plurality of software robots (e.g., a botnet) which run autonomously on a collection of compromised devices under a common command and control (C&C) infrastructure. In one example, a bot on the compromised device may open an Internet Relay Chat (IRC) channel with another device to receive commands. This IRC channel may be referred to as a C&C communication channel for the bot.

The bot comprises one or more compromised devices which may create and send spam and malware, such as viruses, worms, or trojan horses, for example. A virus is an intrusive program that infects a computer file by inserting a copy of itself in the file. The copy is usually executed when the file is loaded into memory, allowing the virus to infect other files. A worm is a program that propagates itself across multiple computers, usually by creating copies of itself in each computer's memory. A worm may duplicate itself in a computer so many times that it causes the computer to crash. A trojan horse is a destructive program disguised as a game, utility, or application. When run by a user or computer program, a trojan horse can harm the computer system while appearing to do something useful.

Malware may also include adware and spyware. Adware is a program configured to direct advertisements to a computer or a particular user. In one example, adware identifies the computer and/or the user to various websites visited by a browser on the computer. The website may then use the adware to either generate pop-up advertisements or otherwise direct specific advertisements to the user's browser. Spyware is a program configured to collect information regarding the user, the computer, and/or a user's network habits. In an example, spyware may collect information regarding the names and types of websites that the user browses and then transmit the information to another computer. Adware and spyware are often added to the user's computer after the user browses to a website that hosts the adware and/or spyware. The user is often unaware that these programs have been added and are similarly unaware of the adware and/or spyware's function.

Figure 1:
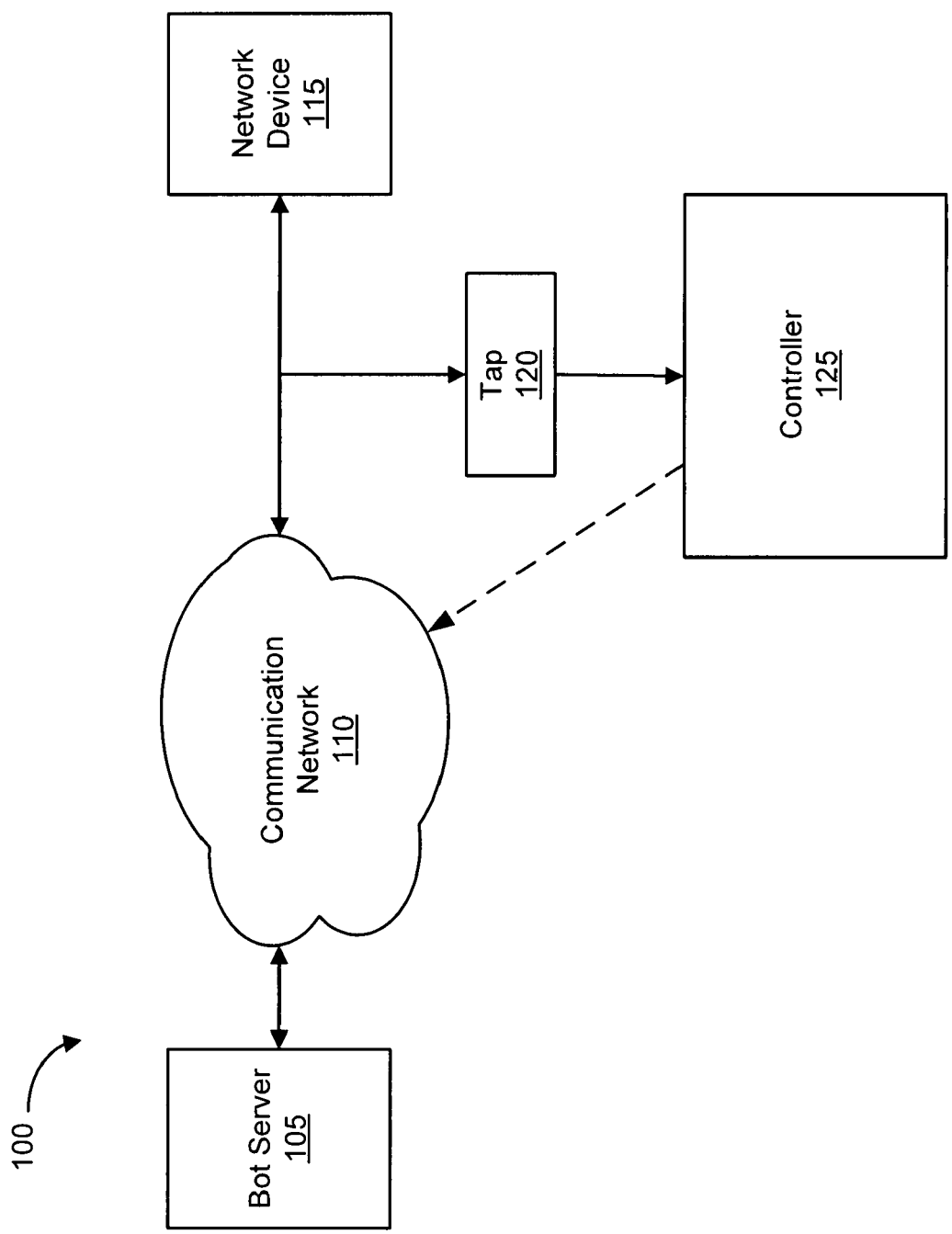
FIG. 1 is a diagram of a channel detection environment in which embodiments of the present invention may be practiced.

FIG. 1 is a diagram of a channel detection environment 100 in which embodiments of the present invention may be practiced. The channel detection environment 100 may comprise a bot server 105 in communication via a communication network 110 with a network device 115. Additionally, a tap 120 may be coupled to the communication network 110. The tap 120 may be further coupled to a controller 125. Optionally, a router (not shown) may be provided for re-routing data from the communication network 110.

The bot server 105 and the network device 115 comprise digital devices. A digital device comprises any device with a processor (see FIG. 6). Some examples of digital devices include computers, servers, laptops, personal digital assistants, and cellular telephones. The bot server 105 is configured to transmit network data over the communication network 110 to the network device 115, which is configured to receive the network data. In some embodiments, the bot server 105 may establish a C&C communication channel with the network device 115 via the communication network 110. The C&C communication channel may be utilized by the bot server 105 to control a bot on the node or the node itself on the network device 115.

The bot server 105 may attempt to control the network device 115 by transmitting instructions or a bot to the network device 115. In one example, the bot server 105 is a computer controlled by an illicit user to control one or more bots or one or more network devices 115 through the use of bots. In another example, the bot server 105 is a network device similar to the network device 115; the bot server 105 may be a part of a P2P communication network for transmitting instructions to a bot on another digital device. In this example, once infected, the network device 115 may be a part of a P2P communication network whereby the network device 115 may transmit instructions to another network device similar to a bot server 105.

The tap 120 may comprise a digital data tap configured to monitor network data and provide a copy of the network data to the controller 125. In some embodiments, the tap 120 comprises a span port. The network data comprises signals and data that are transmitted over the communication network 110 including data flows from the bot server 105 to the network device 115. As discussed herein, the network data may include encrypted command and control instructions transmitted from the bot server 105. In one example, the tap 120 copies the network data without an appreciable decline in performance of the bot server 105, the network device 115, or the communication network 110.

The tap 120 may copy any portion of the network data. For example, the tap 120 can receive and copy any number of data packets of the network data. In exemplary embodiments, the tap 120 can monitor and copy data transmitted from multiple devices without appreciably affecting the performance of the communication network 110 or the devices coupled to the communication network 110. In various embodiments, the tap 120 can sample the network data based on a sampling scheme.

The tap 120 can also capture metadata from the network data. The metadata can be associated with the bot server 105 and/or the network device 115. In one example, the metadata may identify the bot server 105 and/or the network device 115. In some embodiments, the bot server 105 transmits unencrypted metadata, which is captured by the tap 120. In other embodiments, a heuristic module, described in more detail below, can determine the bot server 105 and/or the network device 115 by analyzing unencrypted or decrypted data packets within the network data and generate the metadata.

The communication network 110 may comprise a public computer network such as the Internet, a private computer network such as a wireless telecommunication network, wide area network, local area network, or any other type of network enabled to provide communications between coupled devices.

Although FIG. 1 depicts network data transmitted from the bot server 105 to the network device 115, either device can transmit and receive network data from the other device. Similarly, although only one bot server 105, communication network 110, network device 115, tap 120, and controller 125 are depicted in FIG. 1, there may be any number of bot servers 105, communication networks 110, network devices 115, taps 120, and controllers 125.

The controller 125 may comprise a processor and/or software configured to receive and analyze network data for the presence of data sent via the C&C communication channel. In various embodiments, the controller 125 receives network data over the tap 120. If the controller 125 detects a pattern of communication similar to the pattern of communication performed by a bot, the controller 125 may take corrective action.

In one example, after detection of a pattern of communication similar to the pattern of communication performed by a bot, the controller 125 may notify the user, administrator, or responsible parties of the potential bot and provide information related to detection. In another example, the controller 125 may intercept all network data from a node on the communication network that either received or sent the encrypted network data (e.g., the bot server 105 and the network device 115). When network data is intercepted, the network data is no longer received by the intended recipient but rather is received by the controller 125. In some embodiments, the associated network data is intercepted when network data is flagged as suspicious. Alternately, the controller 125 may simply block all communications with the bot server 105 and/or the network device 115. These processes are further discussed in FIG. 2.

If the controller 125 detects unencrypted or decrypted commands within network data that potentially establishes a C&C communication channel, the controller 125 may intercept or block the associated network data. Similarly, the controller 125 may notify the user, administrator, or responsible parties of the potential bot and provide information related to detection.

In some embodiments, the controller 125 can organize the network data into one or more data flows. Data flows can then be reconstructed based on the network data samples received from the tap. The controller 125 is further discussed in more detail in connection with FIG. 4.

Figure 2:
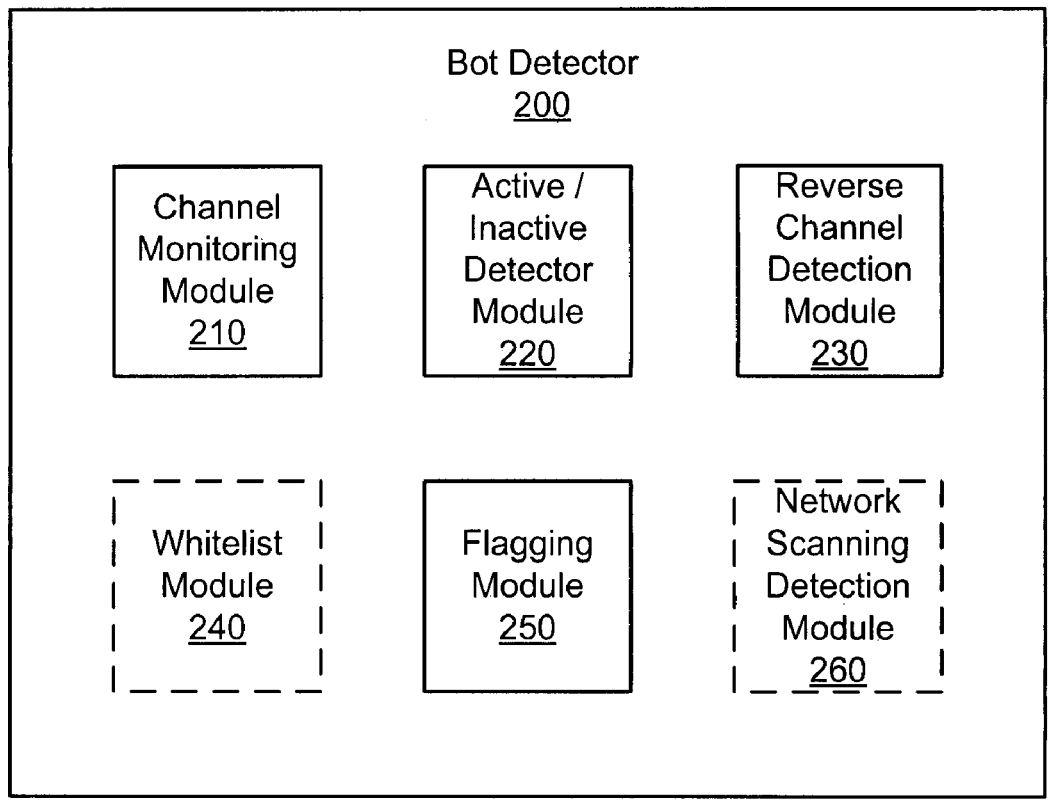
FIG. 2 is a block diagram of an exemplary bot detector 200 for detecting encrypted communication.

FIG. 2 is a block diagram of an exemplary bot detector 200 for detecting encrypted communication. The exemplary bot detector 200 comprises a channel monitoring module 210, an active/inactive detector module 220, a reverse channel detection module 230, an optional whitelist module 240, a flagging module 250, and an optional network scanning detection module 260.

The IRC protocol may be used for command and control of a bot. Detecting the existence or establishment of an IRC channel in the network may indicate a possible bot C&C communication channel. In one embodiment, the channel monitoring module 210 is utilized to detect an IRC C&C channel.

In exemplary embodiments, the channel monitoring module 210 scans network data to detect a bot oriented IRC command, such as .advscan and SCAN, to highlight IRC channels to a potential bot server 105. The network data used to establish the IRC channel may not be encrypted. In one example, the channel monitoring module 210 scans network data received from that tap 120 to determine if an IRC channel is being established (e.g., JOIN and JOIN confirm commands). If the IRC channel has been established, the channel monitoring module 210 may scan all network data going to or coming from at least one device involved in the IRC channel to detect bot oriented commands (e.g., by scanning for an .advscan message).

The active/inactive detector module 220 may detect C&C communications by detecting when there is bidirectional communication with the network device 115. When the active/inactive detector module 220 detects bidirectional communication, the active/inactive detector module 220 identifies the communication as "active" or "on". When the active/inactive detector module 220 does not detect any communication, the active/inactive detector module 220 identifies the network device as "inactive" or "off". The active/inactive detector module 220 may ignore "keep alive" signals commonly found in TCP communications. In various embodiments, the active/inactive detector module 220 can detect "active" and "inactive" periods of a network device 115 even if the network data is encrypted.

Typically, client programs on the network device 115 initiate request/response pairs when communicating with a server. In one example, for a request, there is a response. However, when a bot awaits instructions, the bot may initiate a connection with a bot server 105 but then primarily responds to request from the server side (e.g., the infected network device 115 primarily responds in a "reverse channel"). In one example, a reverse channel is one in which the connection is established from one direction (e.g., network device 115 to the bot server 105) but communication patterns are primarily request/response pairs driven in the reverse direction (e.g., bot server 105 to the network device 115). The technique of detecting a reverse channel may be effective against encrypted communication by or to a bot over a command and control channel.

The reverse channel detection module 230 may detect reverse channel communication based on the active and inactive periods of a network device 115 provided by the active/inactive detector module 220. In one example, the reverse channel detection module 230 analyzes the active and inactive periods to detect an establishment of communication by the network device 115 to another device. The reverse channel detection module 230 then analyzes the following active and inactive periods to detect if the network device 115 then rests for a number of inactive periods punctuated primarily by network data coming from the other device. Those skilled in the art will appreciate that there are many ways in which a reverse channel may be detected. Once detected, the reverse channel detection module 230 may direct the flagging module 250 to flag the network device 115 and/or the other device that the network device 115 is in communication with, as suspicious.

In another example, the reverse channel detection module 230 analyzes the active and inactive periods of various data flows over different ports of the network device 115 in order to gather further information regarding the possibility of infection. If the reverse channel is detected from a specific port of the network device 115, network data directed to that port may be blocked or intercepted. Similarly, other devices that have been in communication through the suspected port on the suspicious network device 115 may also be flagged as suspicious.

In various embodiments, the reverse channel detection module 230 calculates or receives a predetermined time between communications before accepting that the network device 115 is inactive. In order to avoid categorizing a slow response as a period in which the network device 115 is inactive, the reverse channel detection module 230 may calculate the time between communication activities of the network device 115. If the time elapsed between communication activities is less than the predetermined time, then the network device 115 may be identified as active during that time. Otherwise, the network device 115 may be determined to be inactive.

In various embodiments, the reverse channel detection module 230 learns and/or analyzes the behavior of the network devices. In one example, the mean and standard deviation of time differences between request-response pairs communication in each direction is recorded. Period categorized as inactive may be several standard deviations removed from the request-response delay period. Those skilled in the art will appreciate that there are many ways (including statistical methods) in which the reverse channel detection module 230 or the active/inactive detector module 220 may determine active and inactive periods of the network device 115.

In various embodiments, the bot detector 200 analyzes both encrypted and unencrypted network data to detect a C&C communication channel. In one example, the channel monitoring module 210 may detect an unencrypted command to establish an IRC channel. The flagging module 250 may then flag the network device 115 as a suspected bot infected device. Network data transmitted from and received by the suspected bot infected device may be analyzed by the active/inactive detector module 220 to further confirm, verify, or deny the possibility that the device is infected.

In some embodiments, the controller 125 (not just the bot detector 200) analyzes both encrypted and unencrypted network data to detect a C&C communication channel. In one example, the channel monitoring module 210 may detect an unencrypted command to establish an IRC channel. The flagging module 250 may then flag the network device 115 as a suspected bot infected device. Once the network device 115 is flagged, the network data from the network device 115 may be analyzed by the controller 125. If unencrypted network data transmitted from the network device 115 reveals a bot related activity (e.g., establishment of a new IRC chat, denial of service attack, spam attack, port scan, or bot propagation), the controller 125 may take corrective action. In one example, the controller 125 may notify a user that the network device 115 may be infected. The controller 125 may also block network data to and from the suspected network device 115. In some embodiments, the controller 125 may also flag other network devices as suspicious if they have been in communication with the suspected infected device.

The whitelist module 240 maintains a list of network devices 115 that are trusted or engaged in trusted activity. The whitelist module 240 may identify one or more network devices 115 that, due to customized software or familiarity with the function of the network devices 115, are trusted. When a network device 115 is trusted, the flagging module 250 may not flag the trusted network device 115 as suspicious. In one example, the whitelist module 240 may identify a network device 115 as likely to engage in reverse channel communication. If the reverse channel detection module 230 detects a reverse channel associated with the trusted network device 115, the network device 115 will not be flagged as suspicious. In some embodiments, network data from any network device regarded as trusted may not be analyzed by the bot detector 200 and/or the controller 125.

In various embodiments, the whitelist module 240 may identify specific network devices 115 with trusted behaviors. For example, a network device may provide a data feed which may display reverse channel properties. If the otherwise trusted network device 115 behaves in a way that is not trusted, the network device 115 may be flagged as suspicious. In one example, the whitelist module 240 may identify a network device 115 that is likely to establish an IRC communication channel on a specific port (e.g., a standard port). If the bot detector 200 detects that the network device 115 has established an IRC communication channel on another port (e.g., a nonstandard port), the network device 115 may be flagged as suspicious.

The flagging module 250 may be configured to flag one or more network devices 115 as suspicious (e.g., possibly infected with a bot) as discussed herein. In various embodiments, the flagging module 250 may also flag devices that are in communication with a suspicious network device. In one example, a tracking module (not depicted) may, track those devices involved in communication over a predetermined time. Once a device is flagged as suspicious, the flagging module 250 may flag other devices that have been in communication with the suspicious device. In one example, a network device 115 has been flagged as suspicious for entering into a reverse channel communication with a known infected device (e.g., a bot server). The network device 115 may be identified and the flagging module 250 may flag all other nodes (e.g., other network devices) that have been or are in communication with the network device 115.

A network scanning detection module 260 may analyze network data for scanning activity. In one example, a network device 115 establishes an IRC channel. The network scanning detection module may then detect a scan of nodes on the network by the network device 115. In another example, the reverse channel detection module 230 may collect data regarding the behavior of a network device 115. While collecting data, but before a determination is made, the network scanning detection module 260 may detect a network scan and provide that information to the flagging module 250 which may determine to flag the network device 115 as suspicious based on the limited collection of data of the reverse channel detection module 230 and the detected scan. There may be many ways in which the modules may work together to flag a network device 115 as suspicious.

Although FIG. 2 depicts various modules comprising the bot detector 200, fewer or more modules can comprise the bot detector 200 and still fall within the scope of various embodiments.

Figure 3:
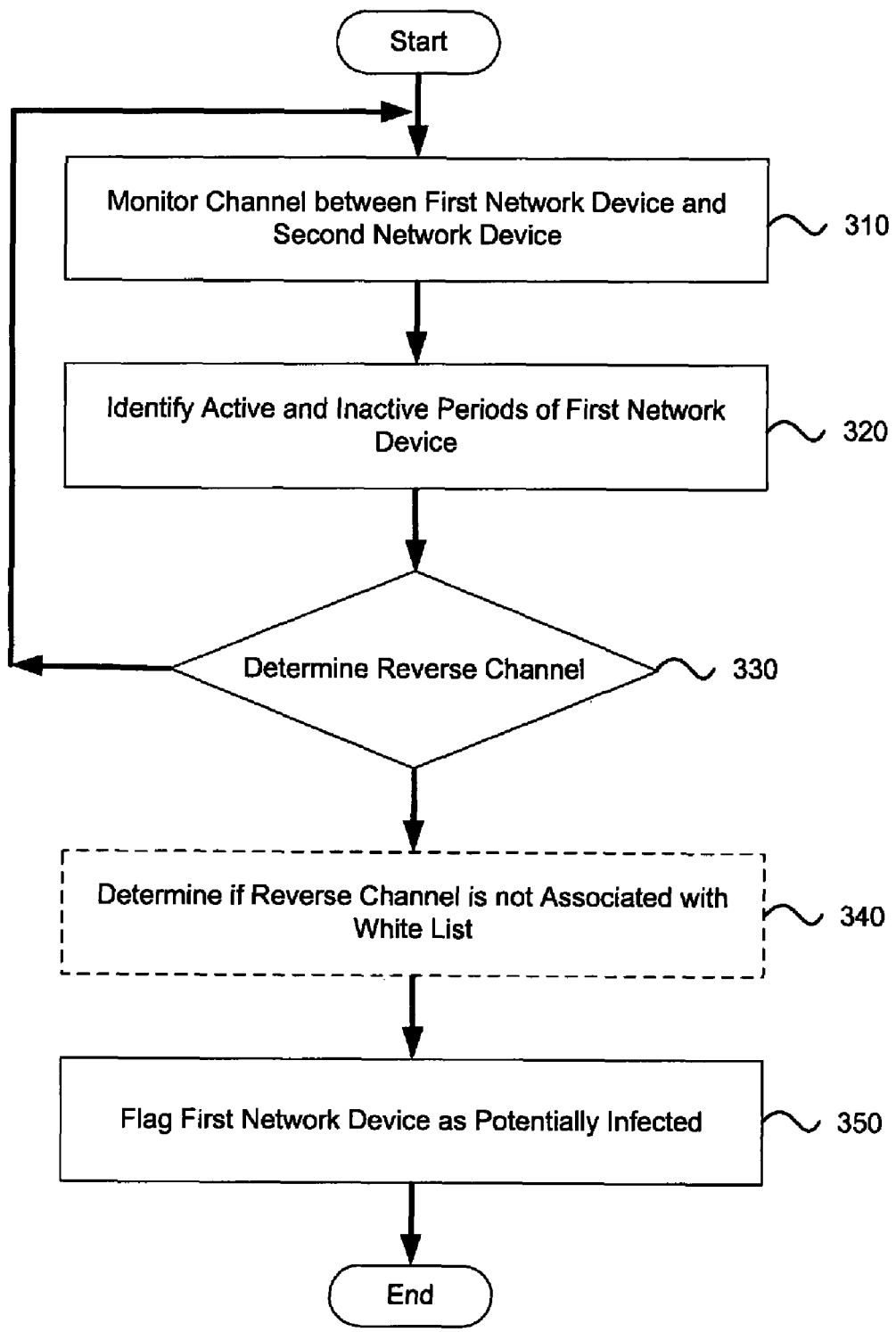
FIG. 3 is a flowchart of an exemplary method for detecting encrypted bot command and control communication channels.

FIG. 3 is a flowchart of an exemplary method for detecting encrypted bot command and control communication channels. In step 310, the bot detector 200 monitors the channel between a first network device and a second network device. The first and second network devices may comprise a bot server 105, a network device 115, or any other device coupled to a network. In one example, a tap transmits network data to the active/inactive detector module 220.

In step 320, the bot detector 200 identifies active and inactive periods of the first network device. In one example, the active/inactive detector module 220 identifies active and inactive periods of the first network device and provides the information to the reverse channel detection module 230. In other embodiments, the bot detector 200 identifies the active and inactive periods of the second network device.

In step 330, the bot detector 200 determines if a reverse channel exists. For example, based on the information from the active/inactive detector module 220, the reverse channel detection module 230 may determine that the first network device established a connection with the second network device, but thereafter primarily received network data from the second network device with no or only limited response.

In step 340, the bot detector 200 determines if the reverse channel is associated with a white list. In some embodiments, the reverse channel detection module 230 identifies the first network device and/or the second network device and provides that information to the whitelist module 240. The whitelist module 240 may then determine if the first network device and/or the second network device is trusted. If either device is trusted, the whitelist module 240 may instruct the flagging module 250 to not flag the first or second network devices even if a reverse channel is detected.

In other embodiments, the reverse channel detection module 230 retrieves information from the whitelist module 240. In one example, the whitelist module 240 comprises a data structure (e.g., database) that identifies network devices as trusted and/or untrusted. The whitelist module 240 may also identify behaviors or ports through which a reverse channel may ordinarily exist. The reverse channel detection module 230 may base the determination of a reverse channel based in part on the information provided by the whitelist module 240.

In step 350, based on the determination of a reverse channel from an untrusted network device or a network device with untrusted behavior, the bot detector 200 may flag the first network device as potentially infected. In one example, the reverse channel detection module 230 may direct the flagging module 250 to flag the first network device.

Figure 4:
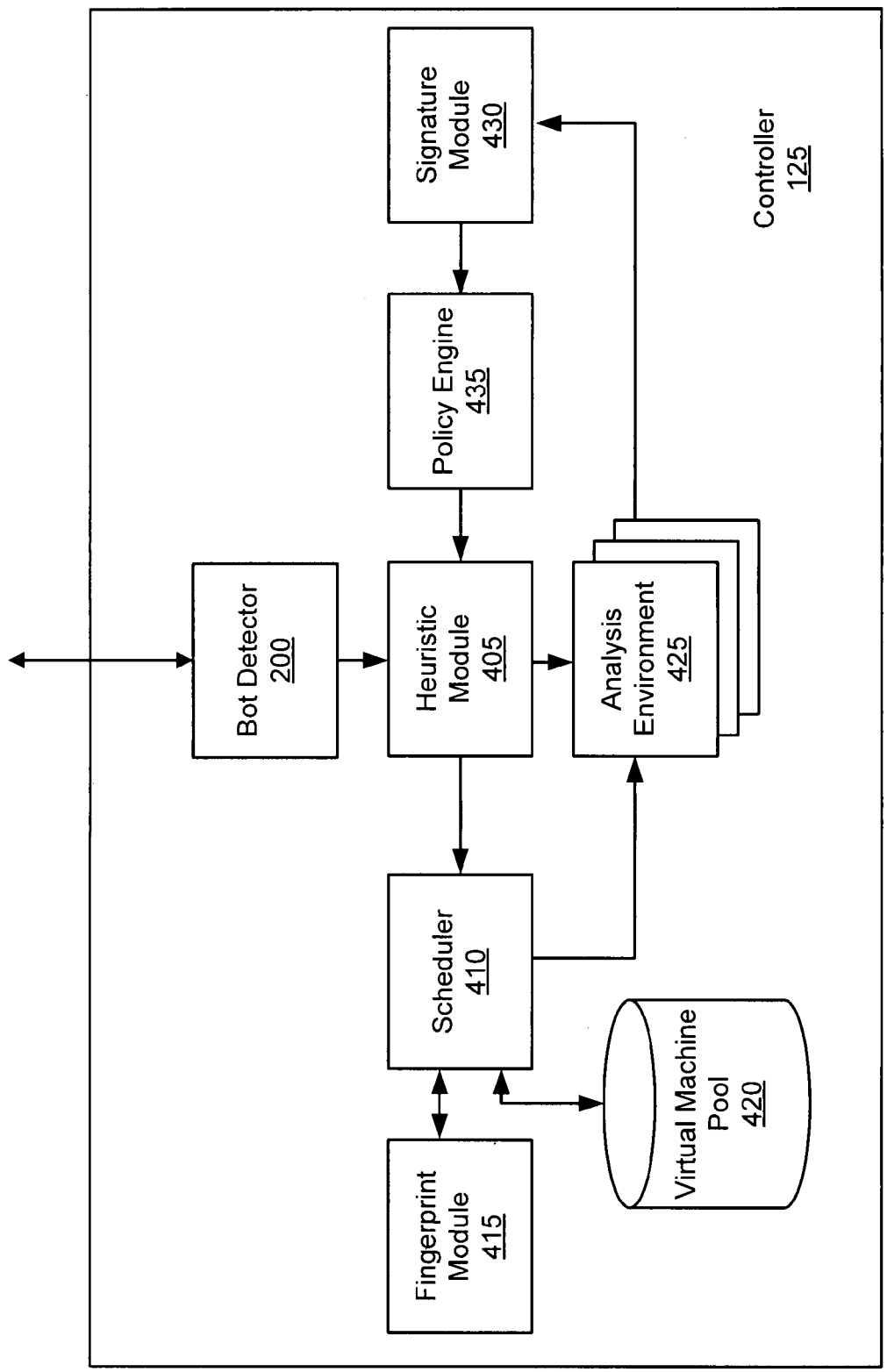
FIG. 4 is a block diagram of an exemplary controller implementing some embodiments of the present invention.

FIG. 4 is a block diagram of an exemplary controller 125 implementing some embodiments of the present invention. The controller 125 may be any digital device or software that receives network data. The exemplary controller 125 may comprise bot detection components similar to the bot detector 200 of FIG. 2.

The controller 125 may further comprise a heuristic module 405, a scheduler 410, a fingerprint module 415, a virtual machine pool 420, an analysis environment 425, a signature module 430, and a policy engine 435. In some embodiments, the controller 125 comprises a tap which is further coupled to the communication network 110. In other embodiments, the controller 125 is coupled to an external tap 120 or may be directly coupled to the communication network 110.

The exemplary heuristic module 405 may receive a copy of unencrypted or decrypted network data from the communication network 110. The heuristic module 405 applies heuristics and/or probability analysis to determine if the network data may contain suspicious activity (such as bot related activity). In one example, the heuristic module 405 flags network data as suspicious. The network data can then be buffered and organized into a data flow. The data flow is then provided to the scheduler 410. In some embodiments, the network data is provided directly to the scheduler 410 without buffering or organizing the data flow.

The heuristic module 405 may perform any heuristic and/or probability analysis. In some embodiments, once a C&C communication channel has been detected or suspected, analysis of decrypted or unencrypted network data may be performed to confirm and/or verify the C&C channel. In various embodiments, once the flagging module of the bot detector 200 identifies a potential C&C communication channel, network data from the channel may be forwarded to the scheduler 410.

In other embodiments, the heuristic module 405 performs a dark internet protocol (IP) heuristic. A dark IP heuristic can flag network data coming from a bot server 105 that has not previously been identified by the heuristic module 405. The dark IP heuristic can also flag network data going to an unassigned IP address. In an example, a bot scans random IP addresses of a network to identify an active server or workstation. The dark IP heuristic can flag network data directed to an unassigned IP address as well as the device that originated such network data.

The heuristic module 405 can also perform a dark port heuristic. A dark port heuristic can flag network data transmitted to an unassigned or unusual port address. Such network data transmitted to an unusual port can be indicative of a port scan by a worm, hacker, or bot. Further, the heuristic module 405 can flag network data from the bot server 105 or network device 115 that is significantly different than traditional data traffic transmitted by the bot server 105 or network device 115. For example, the heuristic module 405 can flag network data from the bot server 105 such as a laptop that begins to transmit network data that is common to a server.

The heuristic module 405 can retain data packets belonging to a particular data flow previously copied by the tap 120. In one example, the heuristic module 405 receives data packets from the tap 120 and stores the data packets within a buffer or other memory. Once the heuristic module 405 receives a predetermined number of data packets from a particular data flow, the heuristic module 405 performs the heuristics and/or probability analysis.

In some embodiments, the heuristic module 405 performs heuristic and/or probability analysis on a set of data packets belonging to a data flow. The heuristic module 405 can then continue to receive new data packets belonging to the same data flow. Once a predetermined number of new data packets belonging to the same data flow are received, the heuristic and/or probability analysis can be performed upon the combination of buffered and new data packets to determine a likelihood of suspicious activity.

In some embodiments, an optional buffer receives the flagged network data from the heuristic module 405. The buffer can buffer and organize the flagged network data into one or more data flows before providing the one or more data flows to the scheduler 410. In various embodiments, the buffer can buffer network data and stall before providing the network data to the scheduler 410. In one example, the buffer stalls the network data to allow other components of the controller 125 time to complete functions or otherwise clear data congestion.

The scheduler 410 is a module that identifies the network device 115 to receive the copied network data and retrieves a virtual machine associated with the network device 115. A virtual machine may be software that is configured to mimic the performance of a device (e.g., the network device 115). The virtual machine can be retrieved from the virtual machine pool 420.

In some embodiments, the heuristic module 405 transmits the metadata identifying the network device 115 to receive the copied network data to the scheduler 410. In other embodiments, the scheduler 410 receives one or more data packets of the network data from the heuristic module 405 and analyzes the one or more data packets to identify the network device 115. In yet other embodiments, the metadata can be received from the tap 120.

The scheduler 410 can retrieve and configure the virtual machine to mimic pertinent performance characteristics of the network device 115. In one example, the scheduler 410 configures characteristics of the virtual machine to mimic only those features of the network device 115 that are affected by the network data copied by the tap 120. The scheduler 410 can determine the features of the network device 115 that are affected by the network data by receiving and analyzing the unencrypted network data from the tap 120. Such features of the network device 115 can include ports that are to receive the network data, select device drivers that are to respond to the network data and any other devices coupled to or contained within the network device 115 that can respond to the network data. In other embodiments, the heuristic module 405 can determine the features of the network device 115 that are affected by the network data by receiving and analyzing the network data from the tap 120. The heuristic module 405 can then transmit the features of the destination device to the scheduler 410.

The optional fingerprint module 415 is configured to determine the packet format of the network data to assist the scheduler 410 in the retrieval and/or configuration of the virtual machine. In one example, the fingerprint module 415 determines that the network data is based on a transmission control protocol/internet protocol (TCP/IP). Thereafter, the scheduler 410 will configure a virtual machine with the appropriate ports to receive TCP/IP packets. In another example, the fingerprint module 415 can configure a virtual machine with appropriate ports to receive user datagram protocol/internet protocol (UDP/IP) packets. The fingerprint module 415 can determine any type of packet format of the network data.

In other embodiments, the optional fingerprint module 415 passively determines a software profile of the network data to assist the scheduler 410 in the retrieval and/or configuration of the virtual machine. The software profile may comprise the operating system (e.g., Linux RH6.2) of the bot server 105 that generated the network data or the operating system of the network device 115 that is to receive the network data. The determination can be based on analysis of the protocol information of the network data. In an example, the fingerprint module 415 determines that the software profile of network data is Windows XP, SP1. The fingerprint module 415 can then configure a virtual machine with the appropriate ports and capabilities to receive the network data based on the software profile. In other examples, the fingerprint module 415 passes the software profile of the network data to the scheduler 410, and the scheduler 410 either selects or configures the virtual machine based on the profile.

The virtual machine pool 420 is configured to store virtual machines. The virtual machine pool 420 may include any storage capable of storing virtual machines. In one example, the virtual machine pool 420 stores a single virtual machine that can be configured by the scheduler 410 to mimic the performance of any network device, such as the network device 115 on the communication network 110. The virtual machine pool 420 can store any number of distinct virtual machines that can be configured to simulate the performance of any of the network devices 115.

The analysis environment 425 is a module that simulates transmission of the network data between the bot server 105 and the network device 115 to identify the effects of malware or illegitimate computer users (e.g., a hacker, computer cracker, or other computer user) by analyzing the simulation of the effects of the network data upon the network device 115 that is carried out on the virtual machine. In exemplary embodiments, there may be multiple analysis environments 425 in order to simulate multiple transmissions of network data.

In one example, the analysis environment 425 simulates transmission of the network data between the bot server 105 and the network device 115 to analyze the effects of the network data upon the network device 115 to detect unauthorized activity. As the analysis environment 425 simulates the transmission of the network data, behavior of the virtual machine can be closely monitored for unauthorized activity. If the virtual machine crashes, performs illegal operations, or performs bot related activity, the analysis environment 425 can react. In some embodiments, the analysis environment 425 performs dynamic taint analysis to identify unauthorized activity.

Once unauthorized activity is detected, the analysis environment 425 can generate an unauthorized activity signature configured to identify network data containing unauthorized activity (e.g., malware attacks or bot related activity). Since the unauthorized activity signature does not necessarily require probabilistic analysis to detect unauthorized activity within network data, unauthorized activity detection based on the unauthorized activity signature may be very fast and save computing time.

In various embodiments, the unauthorized activity signature may provide code that may be used to eliminate or "patch" portions of network data containing an attack. Further, in some embodiments, the unauthorized activity signature may be used to identify and eliminate (i.e., delete) the malware causing the attack. The unauthorized activity signature may also be used to configure digital devices to eliminate vulnerabilities (e.g., correct system settings such as disabling active-x controls in a browser or updating an operating system.)

The analysis environment 425 may store the unauthorized activity signature within the signature module 430. The analysis environment 425 may also transmit or command the transmission of the unauthorized activity signature to one or more other controllers 125, bot detectors 200, network devices 115, switches, and/or servers. By automatically storing and transmitting the unauthorized activity signature, known malware, previously unidentified malware, and the activities of illicit computer users can be quickly controlled and reduced before a computer system is damaged or compromised. The analysis environment 425 is further discussed with respect to FIG. 5.

The signature module 430 receives, authenticates, and stores unauthorized activity signatures. The unauthorized activity signatures may be generated by the analysis environment 425 or another controller 125. The unauthorized activity signatures may then be transmitted to the signature module 430 of one or more controllers 125.

The policy engine 435 is coupled to the heuristic module 405 and is a module that can identify network data as suspicious based upon policies contained within the policy engine 435. In one example, the network device 115 can be a computer designed to attract hackers and/or worms (e.g., a "honey pot"). The policy engine 435 can contain a policy to flag any network data directed to the "honey pot" as suspicious since the "honey pot" should not be receiving any legitimate network data. In another example, the policy engine 435 can contain a policy to flag network data directed to any network device 115 that contains highly sensitive or "mission critical" information.

The policy engine 435 can also dynamically apply a rule to copy all network data related to network data already flagged by the heuristic module 405. In one example, the heuristic module 405 flags a single packet of network data as suspicious. The policy engine 435 then applies a rule to flag all data related to the single packet (e.g., associated data flows) as suspicious. In some embodiments, the policy engine 435 flags network data related to suspicious network data until the analysis environment 425 determines that the network data flagged as suspicious is related to unauthorized activity.

The policy engine 435 may scan network data to detect unauthorized activity based upon an unauthorized activity signature. In some embodiments, the policy engine 435 retrieves the unauthorized activity signature from the signature module 430. The network data is then scanned for unauthorized activity based on the unauthorized activity signature.

The policy engine 435 may scan network data to detect unauthorized activity (e.g., bot related activity) based upon an unauthorized activity signature. In some embodiments, the policy engine 435 retrieves the unauthorized activity signature from the signature module 430. The network data is then scanned for unauthorized activity based on the unauthorized activity signature. The policy engine 435 can also flag network data as suspicious based on policies, as discussed herein.

The policy engine 435 can scan the header and body of a packet of network data. In some embodiments, the policy engine 435 scans only the header of the packet for unauthorized activity based on the unauthorized activity signature. If unauthorized activity is found, then no further scanning may be performed. In other embodiments, the policy engine 435 only scans the packet contents for unauthorized activity.

Unauthorized activity may be found by scanning only the header of a packet, the contents of the packet, or both the header and the contents of the packet. As a result, unauthorized activity that might otherwise evade discovery can be detected. In one example, evidence of unauthorized activity may be located within the contents of the packet. By scanning only the contents of the packet, unauthorized activity may be detected.

If the packet contents or the packet header indicate that the network data contains unauthorized activity, then the policy engine 435, the bot detector 200, the heuristic module 405; or the signature module 430 may take action. In one example, the policy engine 435 may generate a rule or command an interceptor module (not shown) to intercept network data from the node that transmitted the network data and delete or bar the packet from the communication network 110. The policy engine 435 and/or the interceptor module may also quarantine, delete, or bar other packets belonging to the same data flow as the unauthorized activity packet.

Based on a determination that the network data is suspicious, the interceptor module can re-route the associated network data to a virtual machine from the virtual machine pool 420. As discussed herein, the heuristic module 405 can provide information that the network data is suspicious. The interceptor module can intercept all of the network data that is initially flagged by the heuristic module 405. The interceptor module can also base the interception of data on the detection of a malware attack by the analysis environment 425 or a policy or signature by the policy engine 435.

The interceptor module can provide the intercepted data to the heuristic module 405 for analysis with a heuristic or to the analysis environment 425 to orchestrate the transmission of the intercepted data to detect a malware attack. If no malware attack is detected, the interceptor module can transmit some or all of the intercepted data to the intended recipient (e.g., network device 115.) If a malware attack is detected within the intercepted data, the unauthorized activity signature may be generated by the signature module 430 and transmitted to one or more controllers 125, bot detector 200, and/or other digital devices.

The interceptor module can redirect network data from the bot server 105 in any number of ways including, but not limited to, configuring a switch, Address Resolution Protocol (ARP) manipulation, or DHCP services.

The interceptor module may send a request to a switch to redirect network data from any bot server 105 to the controller 125. The switch includes any device configured to receive and direct network data between one or more digital devices. Examples of a switch include, but is not limited to, a router, gateway, bridge, and, or server.

In some embodiments, executable code is loaded onto the switch. In one example, the executable code configures the switch to direct network data from any bot server 105 or network device 115 to the controller 125. In another example, the executable code allows the interceptor module to transmit a request to the switch to direct network data from the bot server 105 to the controller 125. In some embodiments, the interceptor module configures the router to intercept network data from the bot server 105 and/or network device 115 for a predetermined time. The predetermined time may be set by the interceptor module, preloaded into the switch, or configured by a user.

The interceptor module may manipulate dynamic host configuration protocol (DHCP) services to intercept network data. As the bot server 105 transmits network data that is flagged as suspicious or otherwise identified as containing a malware attack, the interceptor module may manipulate DHCP services to assign new IP addresses, associate the controller 125 Media Access Control (MAC) address with the IP address of the network device 115, or otherwise redirect network data from the bot server 105 to the controller 125.

In various embodiments, the interceptor module can manipulate the DHCP server to configure the bot server 105 with a gateway IP address which is the same as the controller's IP address to send all network data to the controller 125. In other embodiments, the interceptor module may perform DHCP services for the communication network 110 as a DHCP server.

In one example of ARP manipulation, the heuristic module 405 or the interceptor module scans the copied network data flagged as suspicious to identify a source IP address and a target IP address. In this example, the source IP address is the IP address of the bot server 105 and the target IP address is the IP address of the network device 115. In some embodiments, the interceptor module may send an ARP reply to the bot server 105. The ARP reply is configured to identify the MAC address of the controller 125 with the IP address of the network device 115. When the bot server 105 receives the ARP reply, the bot server 105 may begin to send network data intended for the destination device to the controller 125.

In other embodiments, a policy within the policy engine 435 may indicate which IP addresses are bot servers 105. Whenever a bot server 105 sends network data for the first time to a network device 115, the bot server 105 may transmit an ARP request. The network data identifying the source IP address is copied by the tap 120 and the policy within the policy engine 435 can flag the source IP address as a bot server 105. Thereafter, the interceptor module may store the ARP request, and provide the controller 125 MAC address in an ARP reply to the switch and/or the bot server 105. Once the switch and/or the bot server 105 receives the controller 125 MAC address in the ARP reply, the IP address of the digital device (e.g., network device 115) will be associated with the controller 125 MAC address (e.g., in memory storage or cache). Network data intended for the network device 115 may then be transmit from the bot server 105 to the controller 125.

The bot server 105 may send network data to any number of digital devices. Before the attack can proceed, the bot server 105 may send a separate ARP request for the IP address of every other digital device the malware wishes to send data to. The controller 125 detects and responds to each ARP request by sending an ARP reply to each request with the controller 125 MAC address. The controller 125 MAC address may be associated with the IP address of the other digital devices on a table within the bot server 105, switch, and/or server (not depicted). The table may be within memory, storage, buffered, and/or cached. As a result, network data transmitted by the bot server 105 to multiple network devices 115 may be intercepted by the controller 125.

Once the network data is intercepted, the network data is re-routed to the virtual machine, as discussed herein. Because the network data is re-routed, the actual machine or the network device 115 for which the network data is intended may not receive the network data and is, as a result, unaffected. A plurality of the network data can be re-routed to more than one virtual machine at one time (e.g., in parallel.) Thus, if the network data intended for a plurality of the network devices 115 is flagged as suspicious, or as coming from the device that has previously been deemed suspicious (e.g., the bot server 105), the interceptor module can select a plurality of virtual machines on which to test the suspicious network data.

Although FIG. 4 depicts various modules comprising the controller 125, fewer or more modules can comprise the controller 125 and still fall within the scope of various embodiments.

Figure 5:
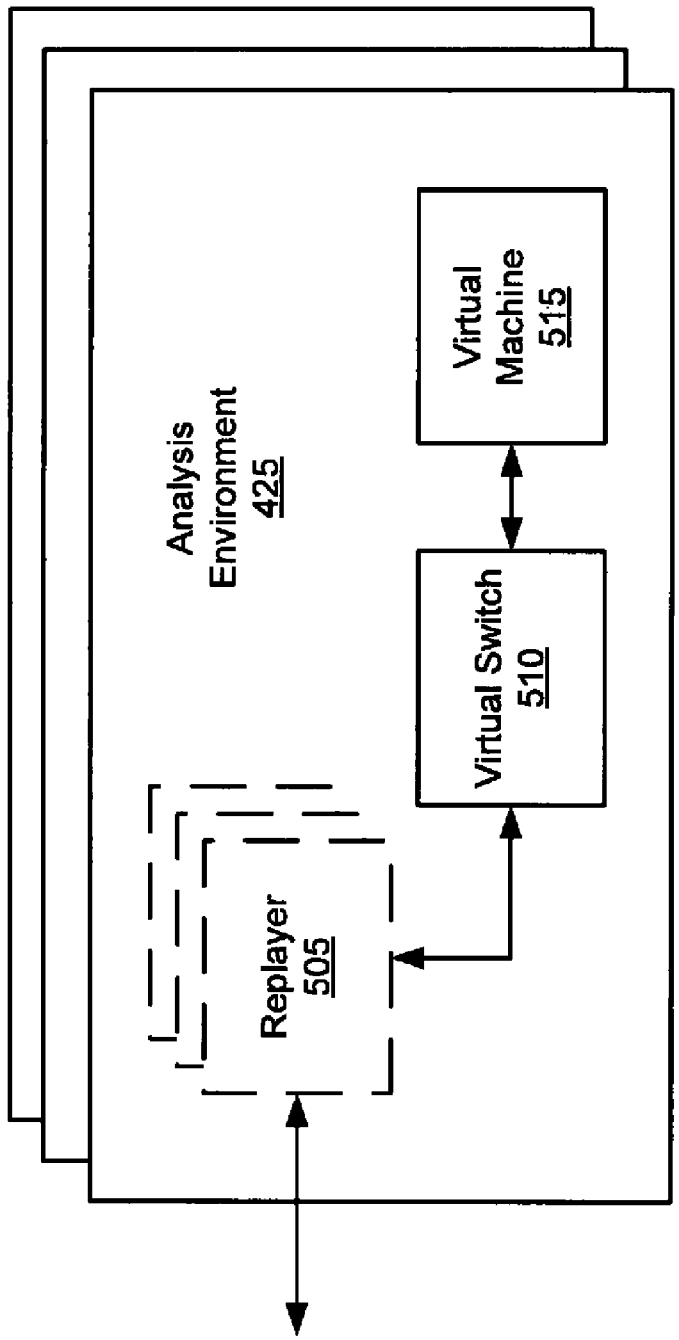
FIG. 5 is a block diagram of an exemplary analysis environment for detecting encrypted bot command and control communication channels.

FIG. 5 is a block diagram of an exemplary analysis environment 425, in accordance with some embodiments of the present invention. The analysis environment 425 comprises a replayer 505, a virtual switch 510, and a virtual machine 515. The replayer 505 is a module that receives network data that has been flagged by the heuristic module 405 and/or the bot detector 200 and replays the network data. In some embodiments, the replayer 505 mimics the behavior of the bot server 105 in transmitting the flagged network data. There can be any number of replayers 505 simulating the transmission of network data between nodes on the communication network (e.g., the bot server 105 and the network device 115). In a further embodiment, the replayer 505 dynamically modifies session variables, as is appropriate, to emulate a "live" client or server of the protocol sequence being replayed. In one example, dynamic variables that may be dynamically substituted include dynamically assigned ports, transaction IDs, and any other variable that is dynamic to each protocol session. In other embodiments, the network data received from the heuristic module 405 is transmitted to the virtual machine 515 without a replayer 505 (e.g., via direct entry).

The virtual switch 510 is a module that is capable of forwarding packets of flagged network data to the virtual machine 515. The virtual machine 515 can simulate network device 115. The virtual switch 510 can route the data packets of the data flow to the correct ports of the virtual machine 515.

The virtual machine 515 is a representation of the network device 115 that can be provided to the analysis environment 425 by the scheduler 410. In one example, the scheduler 410 retrieves a virtual machine 515 from the virtual machine pool 420 and configures the virtual machine 515 to mimic the network device 115. The configured virtual machine 515 is then provided to the analysis environment 425 where it can receive flagged network data from the virtual switch 510.

As the analysis environment 425 simulates the transmission of the network data, behavior of the virtual machine 515 can be closely monitored for unauthorized activity. If the virtual machine 515 crashes, performs illegal operations, performs abnormally, or allows access of data to an unauthorized computer user, the analysis environment 425 can react.

In exemplary embodiments, virtual machines 515 may be used to detect C&C channels and bot infected systems using the C&C channels. C&C channel detection may occur in a replay virtual machine environment (e.g., the replayer 505 transmitting the network data to the virtual machine 515) or in a direct entry virtual machine environment (without the replayer 505). While replay virtual analysis of virtual machines may be leveraged to extract C&C channel information, this may not be possible for all infection protocols. For infection protocols that can be replayed to result in a full bot infection, this technique may yield positive results. For infection protocols that do not go proceed to completion due to an inability to effectively replay unknown worms protocols, for example, the replay environment may not result in a full infection of the virtual machine. This may result in a denial of C&C channel information extraction, which will only become evident post-infection. In those instances, the analysis environment 425 may flag the devices involved in the suspected C&C channel as possibly infected with a bot and continue to track the nodes that communicate with those devices that participate within the suspected C&C channel.

Passive replay virtual machine environments may be effective for C&C channel discovery, since a passive worm may introduce no new worm protocol. Instead, a passive worm may merely piggyback on an existing protocol. Therefore, the existing passive worm replay may be adequate to detect a full bot infection. Passive replay of, for example, web based exploits may be extended to result in full infection and extraction of C&C channel information. Direct entry virtual machine environments are effective in extracting C&C channel information, since there is no need to replay an unknown worm protocol.

In some embodiments, the analysis environment 425 performs dynamic taint analysis to identify unauthorized activity. For a malware attack to change the execution of an otherwise legitimate program, the malware attack may cause a value that is normally derived from a trusted source to be derived from the user's own input. Program values (e.g., jump addresses and format strings) are traditionally supplied by a trusted program and not from external untrusted inputs. Malware, however, may attempt to exploit the program by overwriting these values.

In one example of dynamic taint analysis, all input data from untrusted or otherwise unknown sources are flagged. Program execution of programs with flagged input data is then monitored to track how the flagged data propagates (i.e., what other data becomes tainted) and to check when the flagged data is used in dangerous ways. For example, use of tainted data as jump addresses or format strings often indicates an exploit of a vulnerability such as a buffer overrun or format string vulnerability.

In some embodiments, the analysis environment 425 monitors and analyzes the behavior of the virtual machine 515 in order to determine a specific type of malware or the presence of an illicit computer user. The analysis environment 425 can also generate computer code configured to eliminate new viruses, worms, bots, or other malware. In various embodiments, the analysis environment 425 can generate computer code configured to identify data within the network data indicative of a malware attack, repair damage performed by malware, or the illicit computer user. By simulating the transmission of suspicious network data and analyzing the response of the virtual machine, the analysis environment 425 can identify known and previously unidentified malware and the activities of illicit computer users before a computer system is damaged or compromised.

Once the virtual machine is infected, via either replay or direct entry, the environment can wait for an outbound domain name system (DNS) request. The requested name in the DNS request is likely a C&C channel. A pseudo-DNS server in the virtual machine environment can respond to this request with an IP address mapped to an internal-to-virtual machine-analysis pseudo-server. If an outbound IRC or web request is made to the supplied IP address, then this confirms the existence of the C&C channel.

In some embodiments, all outbound DNS requires may be logged in a circular buffer (not shown). Once a C&C channel DNS name is identified, a search may be performed on all entries in the buffer for other source IP addresses that have requested the same DNS name. These source IP addresses are now highly suspect to be infected with the same bot or malware family that infected the virtual machine, even though these other IP addresses may not have been acknowledged as propagating an infection.

Once a C&C DNS name is discovered, the name may be communicated to all other devices as well as a cloud server. This allows other distributed devices to detect attempts to connect to the same C&C channel.

Although FIG. 5 depicts various modules comprising the analysis environment 425, fewer or more modules can comprise the analysis environment 425 and still fall within the scope of various embodiments.

Figure 6:
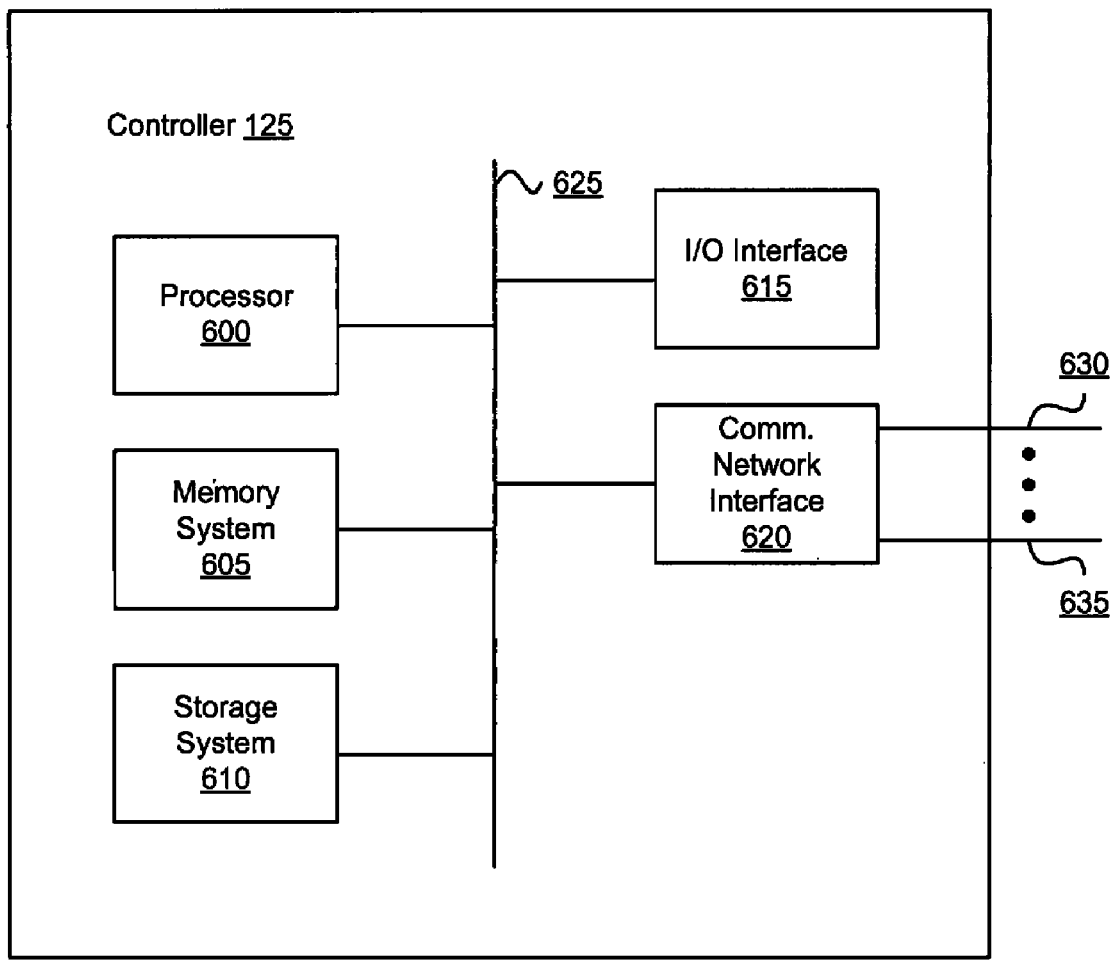
FIG. 6 is another block diagram of an exemplary controller in which embodiments of the present invention may be practiced.

FIG. 6 is another block diagram of an exemplary controller in which embodiments of the present invention may be practiced. Controller 125 may comprise a processor 600, a memory system 605, a storage system 610, an I/O interface 615, and a communication network interface 620 which are all coupled to a system bus 625.

Processor 600 may be configured to execute executable instructions. In some embodiments, the processor 600 comprises circuitry or any one or more processors capable of processing the executable instructions.

Memory system 605 may be any memory configured to store data. Some embodiments of memory system 605 include storage devices, such as RAM or ROM.

Storage system 610 may be any storage configured to retrieve and store data. Some examples of the storage system 610 (e.g., computer readable media) may be flash drives, hard drives, optical drives, magnetic tape, or any combination thereof. Storage system 610 may be configured to comprise a database or other data structure configured to hold and organize data such as network data, copies of network data, or buffered data. In some embodiments, the storage system 610 may comprise memory in the form of RAM and storage in the form of flash data. Memory system 605 or storage system 610 may comprise cache or buffers configured to retain network data or copies of network data. Both the memory system 605 and the storage system 610 may comprise computer readable media which may store instructions or programs that are executable by a computer processor including the processor 600.

The optional Input/output (I/O) interface 615 may be configured to receive input and provide output to a user. I/O interface 615 may be, but is not limited to a keyboard, a mouse, a touch screen, a keypad, a biosensor, floppy disk drive, an audio I/O device, video (display) I/O device, or other I/O device. It will be appreciated that not all controllers 125 comprise the I/O interface 615.

Communication network interface 620 may be configured to be coupled to any user device (e.g., network device 115 and/or bot server 105) via link 630 through link 635. Communication network interface 620 may be configured to support communication over a USB connection, a firewire connection, an Ethernet connection, a serial connection, a parallel connection, an ATA connection, or other network interface. Communication network interface 620 may also be configured to support wireless communication, such as 802.11a/b/g/n, a wireless USB, a Bluetooth device or other communication. Communication network interface 620 may support many wired and wireless standards.

Although only two links, 630 and 635, are depicted in FIG. 6, there may be any number of links. In various embodiments, there may be one link 630 used to transparently copy network data from the communication network 110. The other links may be used by the controller 125 to intercept data from one or more network devices. In one example, controller 125 may comprise multiple IP addresses that may be broadcast from different links. Network data may be intercepted from different infected devices by different links.

The above-described modules may be comprised of instructions that are stored on storage media. The instructions may be retrieved and executed by a processor (e.g., the processor 600). Some examples of instructions include software, program code, and firmware. Some examples of storage media comprise memory devices and integrated circuits. The instructions are operational when executed by the processor to direct the processor to operate in accordance with embodiments of the present invention. Those skilled in the art are familiar with instructions, processor(s), and storage media.

Those skilled in the art will appreciate that exemplary embodiments will detect any number of different potential command and control channels. While various embodiments have been described above, it should be understood that they have been presented by way of example only, and not limitation. Thus, the breadth and scope of a preferred embodiment should not be limited by any of the above-described exemplary embodiments.

What is claimed is:

1. A system comprising:
   a channel monitoring module configured to monitor a channel between a first network device and a second network device;
   an active/inactive detector module configured to detect an active period and an inactive period of the first network device;
   a reverse channel detection module comprising instructions stored on a computer readable medium, the reverse channel detection module being configured to detect an establishment of communication by the first network device and a direction for communication over the channel thereafter based on the detected active period and the inactive period of the first network device with respect to the second network device, the reverse channel detection module being further configured to determine the reverse channel based on communications over the channel being substantially in a reverse direction after the detected establishment; and
   a flagging module configured to flag the first network device as potentially infected by a bot based on the reverse channel determination.

2. The system of claim 1, further comprising a whitelist module for determining if the first network device is associated with a white list.

3. The system of claim 1, wherein the channel monitoring module is further configured to determine if an IRC channel is established by the first network device.

4. The system of claim 1, further comprising a network scanning module configured to determine if the first network device scans a network.

5. The system of claim 1, further comprising a controller configured to simulate data flow between the first network device and the second network device.

6. The system of claim 5, wherein the controller comprises a replayer and a virtual machine, the replayer configured to transmit the data flow to the virtual machine.

7. The system of claim 6, wherein an infection by the bot is confirmed based on an analysis of a response of the virtual machine.

8. The system of claim 5, wherein the controller further comprises a signature module configured to generate a signature to identify the bot.

9. The system of claim 8, wherein the controller is further configured to send the signature to a bot detector.

10. The system of claim 1, wherein the flagging module is further configured to assign a color category to the first network device for review by an administrator.

11. A method comprising:
monitoring a channel between a first network device and a second network device;
detecting an active period and an inactive period of the first network device;
determining a reverse channel based on the detected active period and the inactive period of the first network device with respect to the second network device, the determining including detecting establishment of communication by the first network and a direction for communication over the channel thereafter, and detecting communications over the channel being substantially in a reverse direction after the detected establishment; and
flagging the first network device as potentially infected by a bot based on the reverse channel determination.

12. The method of claim 11, further comprising determining if the reverse channel is associated with a white list.

13. The method of claim 11, further comprising determining if an IRC channel is established by the first network device.

14. The method of claim 11, further comprising determining if the first network device scans a network.

15. The method of claim 11, further comprising simulating a data flow between the first network device and the second network device.

16. The method of claim 15, further comprising transmitting the data flow to a virtual machine.

17. The method of claim 15, further comprising confirming an infection by the bot based on analysis of a response of the virtual machine.

18. The method of claim 11, further comprising generating a signature to identify the bot.

19. The method of claim 18, further comprising sending the signature to a bot detector.

20. A non-transitory computer readable medium having embodied thereon executable instructions, the instructions being executable by a processor for detecting encrypted bot command & control communication channels, the method comprising:
monitoring a channel between a first network device and a second network device;
detecting an active period and an inactive period of the first network device;
determining a reverse channel based on the detected active period and the inactive period of the first network device with respect to the second network device, the determining including detecting establishment of communication by the first network and a direction for communication over the channel thereafter, and detecting communications over the channel being substantially in a reverse direction after the detected establishment; and
flagging the first network device as potentially infected by a bot based on the reverse channel determination.

* * * * *